Oct. 25, 1938. N. C. WADE 2,134,242
PLANT SUPPORT
Filed Nov. 19, 1936
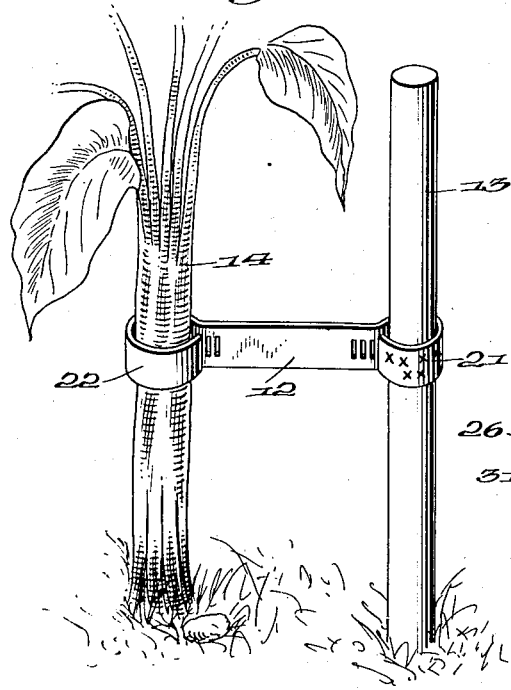
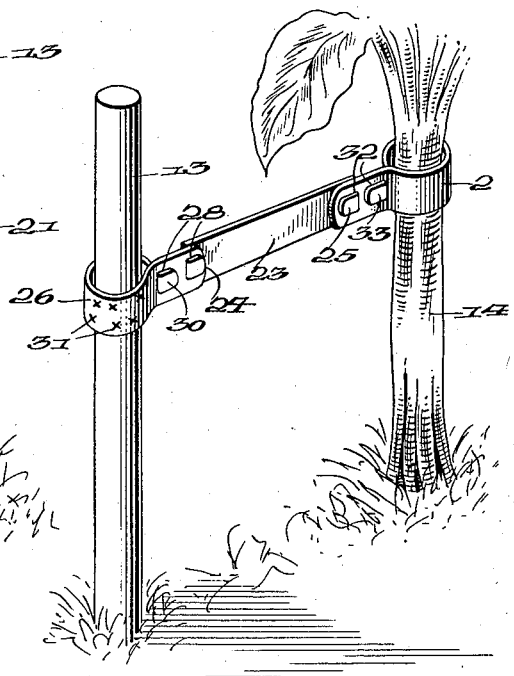
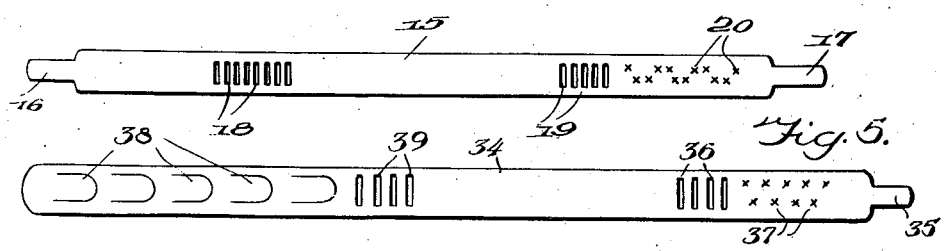
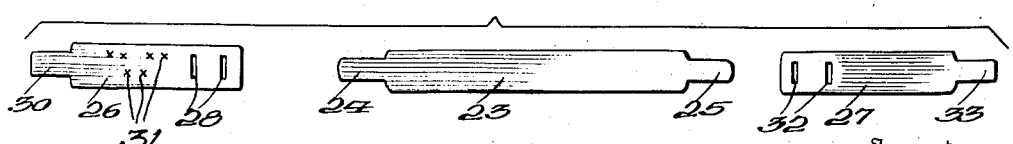
Newman C. Wade, Inventor
By Fetherstonhaugh & Co.
Attorneys Patented Oct. 25, 1938

2,134,242

UNITED STATES PATENT OFFICE 2,134,242

PLANT SUPPORT

Newman C. Wade, Summit, N. J.

Application November 19, 1936, Serial No. 111,725

3 Claims. (Cl. 47—47)

This invention relates to an improved means for securing the stem of a plant or the like in guided relationship to a fixed supporting standard such as a stake or rod driven into the ground in proximity to the plant which it is desired to support.

An object of the invention is the provision of an improved plant support having means for securing the same in fixed relationship to a supporting standard and equipped also with means for guiding a plant stem and retaining the same against undue bending or swaying.

Another object is the provision of a plant support of this character having a wide range of adjustability and one that is light and durable in character.

Other objects will be apparent from the description.

In the drawing—

Figure 1 is a perspective view of an embodiment of the invention as mounted in service.

Figure 2 is a plan view of the strip or blank from which the support or fastener, as shown in Figure 1, is formed.

Figure 3 is a perspective view illustrating an alternative embodiment of the invention as applied in service.

Figure 4 is a group plan view of the elements comprising the embodiment shown in Figure 3.

Figure 5 is a plan view of a further alternative embodiment of fastener strip.

In all forms of the invention the structure comprises a stay having a central shank portion arranged at its opposite ends with seats adapted respectively to be engaged with a fixed supporting standard and the stem of a plant or the like. The device preferably is constructed of light durable metal and may be in strip or wire form. Likewise, the device may be constructed of malleable metal so that it is flexible or in some instances it may be constructed of stiff metal possessing resilient characteristics.

In the embodiment shown in Figures 1 and 2, the support comprises a stay 12 arranged to be secured upon a fixed supporting standard 13, such as a wooden stake or the like that is driven into the ground, to extend laterally therefrom for guiding and supporting engagement at its opposite end with the stem or stalk 14 of a plant or the like.

The stay 12 comprises in this embodiment a malleable metal strip having a central shank portion 15 formed at each end with an integral reduced longitudinal tongue 16 and 17 respectively.

The flat shank 15, at points spaced equi-distantly from its transverse center, is formed with series of transverse parallel keeper slots 18 and 19, respectively, the series 18 being disposed substantially intermediate the transverse center of the shank and its plant engaging end carrying the tongue 16 while the series 19 is disposed substantially intermediate the transverse center of the shank and its standard engaging end carrying the tongue 17. Between the outer ends of the respective series and the ends of the strip shanks, the material of the strip is imperforate as is also the central portion.

At the standard engaging end of the stay, one face of the body of the strip is formed to provide a plurality of piercing or gripping elements 20 which extend substantially over the entire face of the strip between the series of keeper slots 19 and the adjacent end of the strip. The piercing elements are preferably in the form of small points extending laterally from the strip face. They may, however, consist of serrations or other suitable means that will provide a roughened gripping surface having piercing characteristics.

As shown in Figure 1, the stay is employed in service by disposing the shank 15 at the proper horizontal elevation upon the supporting stake 13 and its stake engaging end portion is then looped around the body of the stake in close relationship in a manner forcibly to engage the entrant portion 20 into the body of the wood from which the stake is formed. This looping of the shank end provides a loop or seat 21 that is fixed firmly to the stake. The tongue 17 is passed through one of the keeper slots 19 and the loop is drawn tightly upon the body of the stake whereafter the tongue is turned over in the usual manner to secure the same.

At its other or plant engaging end the body of the strip between the keeper slots 18 and the end of the strip is looped loosely around the plant stem 14 to provide a guide loop or seat 22 and the tongue 16 is passed through an appropriate keeper slot 18 and turned over to secure the stay in position. It will be noted that the diameter of the loop 22 is purposely made in excess of the diameter of the plant stem so that the plant stem is loosely guided and retained in the seat provided by this loop. A feature of the invention resides in the fact that a relatively large number of keeper slots are provided so that the stay is capable of a wide range of adjustment with respect to varying sizes of supporting stakes and plant stems.

In the embodiment shown in Figures 3 and 4 the stay comprises a flat intermediate shank portion 23 having reduced longitudinal tongues 24 and 25 integral therewith at each end, these tongues being arranged to be passed through selected keeper slots in separate seat members or loops 26 and 27 respectively.

The member 26 comprises a malleable metal band of a width corresponding to the width of the intermediate shank portion 23 and having adjacent one end a series of transverse parallel keeper slots 28, one of which receives the tongue 24 of the intermediate shank. At its opposite end the band 26 is provided with an integral securing tongue 30 that is adapted to be passed through another of the keeper slots 28 when the band is looped around the supporting standard 13. The inner face of the loop member 26 is formed with piercing elements 31 which bite into the body of the standard 13 and retain the loop in fixed position with respect thereto.

The plant stem engaging loop 27 is similar to the loop 26 except that it does not carry the piercing elements. This loop 27 comprises a band that is looped loosely around the plant stem 14, the band being provided adjacent one end with a series of transverse parallel keeper slots 32 through which are respectively passed the attaching tongue 25 of the intermediate shank portion 23 and the securing tongue 33 which extends longitudinally from the opposite end of the band. In this embodiment the stay comprises a three part assembly in which the respective plant engaging loop 27 and the standard engaging loop 26 are connected by the intermediate shank portion 23, the plurality of keeper slots providing means of adjusting the lineal length of the stay with respect to the standard and plant stem.

The form of stay illustrated in Figure 5 comprises a malleable metal strip or band 34 formed at its standard engaging end with a reduced integral longitudinal securing tongue 35 that is adapted to be passed through a selected one of a series of transverse parallel keeper slots 36 provided in the body of the strip inwardly of the end a sufficient distance to provide for looping the body of the strip around the supporting standard when engaged therewith. Between the keeper slot 36 and the tongue 35 the body of the strip is formed with a plurality of piercing elements 37 for biting engagement into the body of a standard with which the stay is associated.

At its opposite end portion, comprising the plant stem engaging end, the body of the strip is formed with a longitudinal series of closely spaced die cut tongues 38 that extend from the end of the strip into proximity to a series of transverse parallel keeper slots 39 provided in the strip body. In service the portion of the strip having the tongues 38 which normally lie flush with the strip is looped around a plant stem in loose relationship and an appropriate one of the tongues 38 is then bent outwardly of the plane of the strip to be passed through one of the keeper slots 39 and turned over to secure the connection.

I claim:

1. A plant supporting stay comprising a band of malleable metal, a short reduced tongue integral with and extending from each end thereof, and said band having transverse parallel keeper slots therein substantially midway between each end and its transverse center whereby to receive the tongue on the adjacent end when that end of the band is looped.

2. A plant supporting stay comprising a pair of malleable metal bands bent intermediate their ends to provide loops, one end portion of each band having a series of transverse parallel keeper slots therein, the other end of each band having a locking tongue for engagement with a keeper slot, and an intermediate strip between said loops, said strip having at each end a bendable locking tongue detachably engageable with a loop member keeper slot.

3. A plant supporting stay comprising a malleable metal band having a reduced tongue extending from one end thereof, a series of keeper slots in said band spaced inwardly from the tongue, a plurality of tongues cut in the opposite end portion of said band in a longitudinal series, and a second series of keeper slots in said band at the inner end of said series of tongues.

NEWMAN C. WADE.